US012573018B2

(12) United States Patent
Takemoto

(10) Patent No.: US 12,573,018 B2
(45) Date of Patent: Mar. 10, 2026

(54) DEFECT ANALYSIS DEVICE, DEFECT ANALYSIS METHOD, NON-TRANSITORY COMPUTER-READABLE MEDIUM, AND LEARNING DEVICE

(71) Applicant: MITSUBISHI HEAVY INDUSTRIES, LTD., Tokyo (JP)

(72) Inventor: Hiroshi Takemoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 434 days.

(21) Appl. No.: 18/081,160

(22) Filed: Dec. 14, 2022

(65) Prior Publication Data

US 2024/0046441 A1     Feb. 8, 2024

(30) Foreign Application Priority Data

Aug. 4, 2022     (JP) ................................. 2022-124768

(51) Int. Cl.
| | |
|---|---|
| *G06T 7/00* | (2017.01) |
| *G06T 5/00* | (2024.01) |
| *G06T 5/50* | (2006.01) |

(52) U.S. Cl.
CPC .............. *G06T 7/0004* (2013.01); *G06T 5/00* (2013.01); *G06T 5/50* (2013.01);
(Continued)

(58) Field of Classification Search
CPC ........... G06T 7/0004; G06T 5/00; G06T 5/50; G06T 2207/10132; G06T 2207/20021;
(Continued)

(56) References Cited

U.S. PATENT DOCUMENTS

| | | | |
|---|---|---|---|
| 8,103,085 B1* | 1/2012 | Zadeh | ..................... G06T 7/001 382/141 |
| 2007/0118313 A1* | 5/2007 | Vaccaro | ............. G01N 29/0645 702/66 |

(Continued)

FOREIGN PATENT DOCUMENTS

| | | |
|---|---|---|
| JP | S61-102556 A | 5/1986 |
| JP | 2010-185822 A | 8/2010 |

(Continued)

OTHER PUBLICATIONS

Ji, Changwook et al. "Robot-assisted non-destructive testing of automotive resistance spot welds", Oct. 17, 2020 [retrieved on Mar. 15, 2025], Welding in the World [online], vol. 65, pp. 119-126. Retrieved from Springer Link: <URL: https://link.springer.com/article/10.1007/s40194-020-01002-1>. (Year: 2020) <DOI: https://doi.org/10.1007/s40194-020-01002-1>. (Year: 2020).*

(Continued)

*Primary Examiner* — Matthew C Bella
*Assistant Examiner* — Nicholas John Helco
(74) *Attorney, Agent, or Firm* — HAUPTMAN HAM, LLP

(57) ABSTRACT

A defect analysis device includes a model storage unit configured to store a learned model in which teacher information representing positions, shapes, and sizes of a plurality of defects embedded in a standard test piece is associated with detection information of the plurality of defects detected based on a plurality of standard ultrasonic images acquired from the standard test piece, a target image acquisition unit configured to acquire a plurality of target ultrasonic images from an inspection target, and an enhanced image creation unit configured to create a plurality of enhanced images emphasizing the plurality of defects based on the learned model and the plurality of target ultrasonic images, in which the learned model is learned by giving a
(Continued)

priority to defects to be detected among the plurality of defects in each standard ultrasonic image.

13 Claims, 7 Drawing Sheets

(52) U.S. Cl.
CPC ............... *G06T 2207/10132* (2013.01); *G06T 2207/20021* (2013.01); *G06T 2207/20081* (2013.01); *G06T 2207/20212* (2013.01); *G06T 2207/30108* (2013.01)

(58) Field of Classification Search
CPC ........... G06T 2207/20081; G06T 2207/20212; G06T 2207/30108; G06T 7/0002; G06T 7/174; G06T 5/60; G06T 2207/20012; G06T 2207/20068; G06T 2207/20084; G06T 2207/20192; G06T 2207/20216; G06T 2207/20221; G06T 2207/20224; G06T 2207/30116; G06T 2207/30132; G06T 2207/30136; G06T 2207/30152; G06T 2207/30164; G06T 2207/30168; G06T 2207/30172; G06F 18/2413
See application file for complete search history.

(56) References Cited

U.S. PATENT DOCUMENTS

| | | | | |
|---|---|---|---|---|
| 2013/0261876 A1* | 10/2013 | Froom | ...................... | B64F 5/00 |
| | | | | 901/44 |
| 2016/0300341 A1* | 10/2016 | Hay | ........................... | G06T 7/13 |
| 2020/0096454 A1 | 3/2020 | Konishi et al. | | |

| | | | | |
|---|---|---|---|---|
| 2020/0111204 A1* | 4/2020 | Cosatto | ................. | G06F 18/211 |
| 2020/0160497 A1* | 5/2020 | Shah | .......................... | G06T 7/13 |
| 2020/0182832 A1* | 6/2020 | Lazzari | ............... | G01N 29/221 |
| 2020/0394784 A1* | 12/2020 | Toth | ...................... | G06T 7/0004 |
| 2021/0201472 A1* | 7/2021 | Sohn | .......................... | G06T 7/70 |
| 2021/0340857 A1* | 11/2021 | Mohamed Shibly | ......................... | |
| | | | | G01N 29/4481 |
| 2022/0327731 A1* | 10/2022 | Alalouni | ................. | G06T 7/136 |
| 2022/0375067 A1* | 11/2022 | Osunkwo | .............. | G06T 7/0004 |
| 2022/0415040 A1* | 12/2022 | Khallaghi | ............... | G06T 7/136 |
| 2023/0167732 A1* | 6/2023 | Benslimane | .......... | E21B 47/006 |
| | | | | 340/853.1 |
| 2023/0221286 A1 | 7/2023 | Wada et al. | | |
| 2023/0281787 A1 | 9/2023 | Takemoto | | |
| 2023/0298327 A1 | 9/2023 | Katayama et al. | | |
| 2024/0011917 A1* | 1/2024 | Scharf | ................ | G01N 21/8851 |

FOREIGN PATENT DOCUMENTS

| | | | | |
|---|---|---|---|---|
| JP | 6786035 B2 | 10/2020 | | |
| JP | 2021-196205 A | 12/2021 | | |
| JP | 2021196711 A | * 12/2021 | .......... | G06V 10/776 |
| WO | 2022/044150 A1 | 3/2022 | | |

OTHER PUBLICATIONS

Ji, Changwook et al. "Robot-assisted non-destructive testing of automotive resistance spot welds", Oct. 17, 2020, Welding in the World [online], vol. 65, pp. 119-126. Retrieved from Springer Link: <URL: https://link.springer.com/article/10.1007/s40194-020-01002-1>. (Year: 2020).*

Filipović, Branimir et al. "Automated Ultrasonic Testing of Materials based on C-scan Flaw Classification", Oct. 5, 2021, ISPA 2021, pp. 230-234. Retrieved from IEEE Xplore: <URL: https://ieeexplore.ieee.org/document/9552056>. (Year: 2021).*

* cited by examiner

ECHO INTEGRITY (AMPLITUDE)

SE

BE

DE

IE

F13

F15

F12

F11

F14

TIME (DISTANCE)

F11

F12

F13

F11

F12

D11     D11     D12

F13

FIG. 10
F11
F12
F13
FIG. 11
FIG. 12
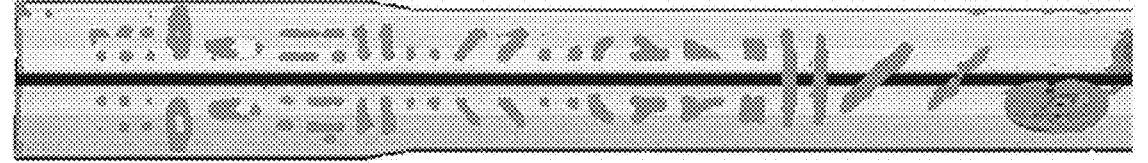

PROCESSOR

93

STORAGE

92

MAIN MEMORY

94

INTERFACE

DEFECT ANALYSIS DEVICE, DEFECT ANALYSIS METHOD, NON-TRANSITORY COMPUTER-READABLE MEDIUM, AND LEARNING DEVICE

BACKGROUND OF THE INVENTION

Field of the Invention

The present disclosure relates to a defect analysis device, a defect analysis method, a non-transitory computer-readable recording medium, and a learning device.

Priority is claimed on Japanese Patent Application No. 2022-124768, filed Aug. 4, 2022, the content of which is incorporated herein by reference.

DESCRIPTION OF RELATED ART

Patent Document 1 describes the following defect detection system. That is, the defect detection system described in Patent Document 1 uses, for example, an ultrasonic flaw detector to emit ultrasonic waves to an object while changing the emission position, and measures reflected waves at each emission position. Then, an image in which the brightness is changed for each intensity distribution of this reflected wave and plotted in a two-dimensional matrix form for each emission position is created as an original image. Furthermore, it is determined whether there is a defect on the basis of a feature amount of a defect candidate region based on the brightness of an image calculated from the original image, and a range of the feature amount calculated from an original image for learning in which a defect place is detected in advance.

PATENT DOCUMENTS

[Patent Document 1] Japanese Patent No. 6786035

SUMMARY OF THE INVENTION

However, in the defect detection system described in Patent Document 1, if a plurality of original images for learning are to be prepared, there is a problem that the original images are acquired by, for example, measurement a plurality of times, and it may take much time and effort in some cases.

The present disclosure has been made to solve the problem described above, and an object thereof is to provide a defect analysis device, a defect analysis method, a non-transitory computer-readable recording medium, and a learning device that can efficiently analyze defects.

In order to solve the problems described above, a defect analysis device according to the present disclosure includes a model storage unit configured to store a learned model in which teacher information representing positions, shapes, and sizes of a plurality of defects embedded in a standard test piece is associated with detection information of the plurality of defects detected based on a plurality of standard ultrasonic images acquired from the standard test piece, a target image acquisition unit configured to acquire a plurality of target ultrasonic images from an inspection target, and an enhanced image creation unit configured to create a plurality of enhanced images emphasizing the plurality of defects based on the learned model and the plurality of target ultrasonic images, in which the learned model is learned by giving a priority to defects to be detected among the plurality of defects in each standard ultrasonic image.

A defect analysis method according to the present disclosure includes a step of acquiring a plurality of target ultrasonic images from an inspection target, and a step of creating a plurality of enhanced images emphasizing a plurality of defects based on a learned model in which teacher information representing positions, shapes, and sizes of the plurality of defects embedded in a standard test piece is associated with detection information of the plurality of defects detected based on a plurality of standard ultrasonic images acquired from the standard test piece, and the plurality of target ultrasonic images, in which the learned model is learned by giving a priority to defects to be detected among the plurality of defects in each standard ultrasonic image.

A non-transitory computer-readable recording medium according to the present disclosure stores a program causing a computer to execute a step of acquiring a plurality of target ultrasonic images from an inspection target, and a step of creating a plurality of enhanced images emphasizing a plurality of defects based on a learned model in which teacher information representing positions, shapes, and sizes of the plurality of defects embedded in a standard test piece is associated with detection information of the plurality of defects detected based on a plurality of standard ultrasonic images acquired from the standard test piece, and the plurality of target ultrasonic images, in which the learned model is learned by giving a priority to defects to be detected among the plurality of defects in each standard ultrasonic image.

A learning device according to the present disclosure includes a machine learning unit configured to generate a learned model by performing learning on the basis of teacher information representing positions, shapes, and sizes of a plurality of defects embedded in a standard test piece and detection information of the plurality of defects detected based on a plurality of standard ultrasonic images acquired from the standard test piece, in which the learned model is learned by giving a priority to defects to be detected among the plurality of defects in each standard ultrasonic image.

According to the defect analysis device, the defect analysis method, the non-transitory computer-readable recording medium, and the learning device of the present disclosure, it is possible to efficiently analyze a defect.

BRIEF DESCRIPTION OF THE DRAWINGS

FIG. 10 is a diagram which shows an example of a plurality of binarized images according to the embodiment of the present disclosure.

FIG. 11 is a diagram which shows an example of a plurality of binarized integrated images according to the embodiment of the present disclosure.

FIG. 12 is a diagram which shows an example of a plurality of superimposed images according to the embodiment of the present disclosure.

Figure 15:
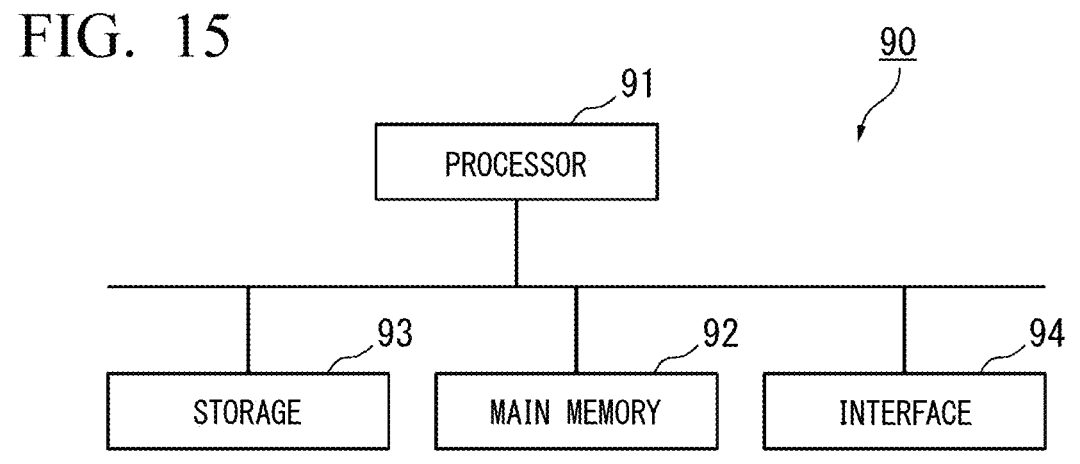

FIG. 15 is a schematic block diagram which shows a configuration of a computer according to at least one embodiment.

DETAILED DESCRIPTION OF THE INVENTION

Figure 1:
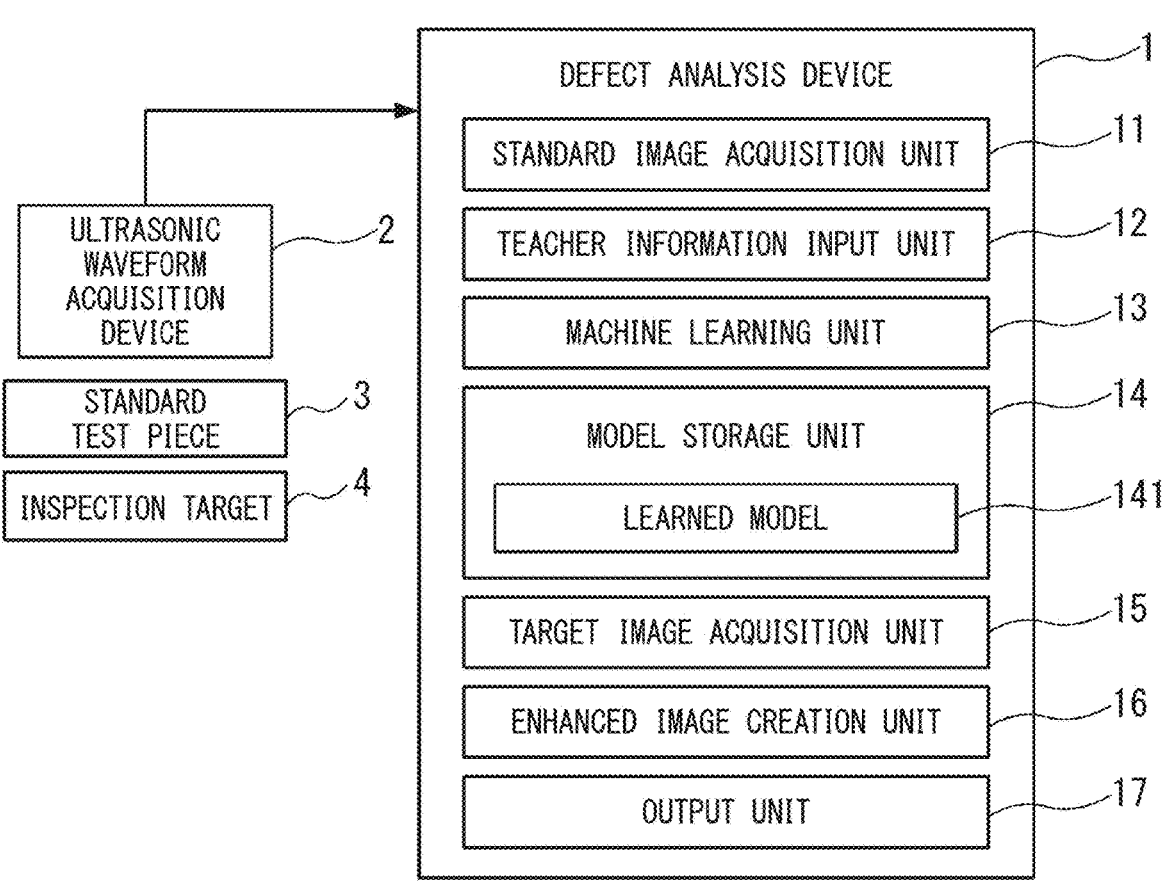
FIG. 1 is a block diagram which shows a configuration example of a defect analysis device according to an embodiment of the present disclosure.
Figure 2:
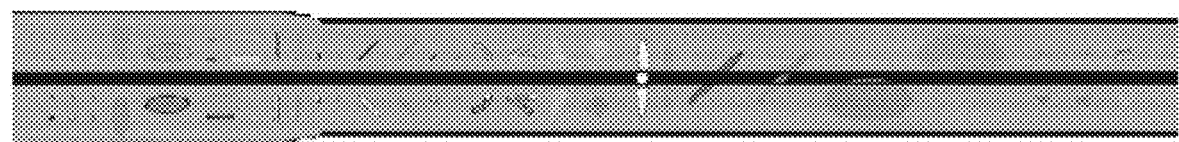
FIG. 2 is a diagram which shows an example of an ultrasonic image obtained by measuring a standard test piece according to an embodiment of the present disclosure.
Figure 3:
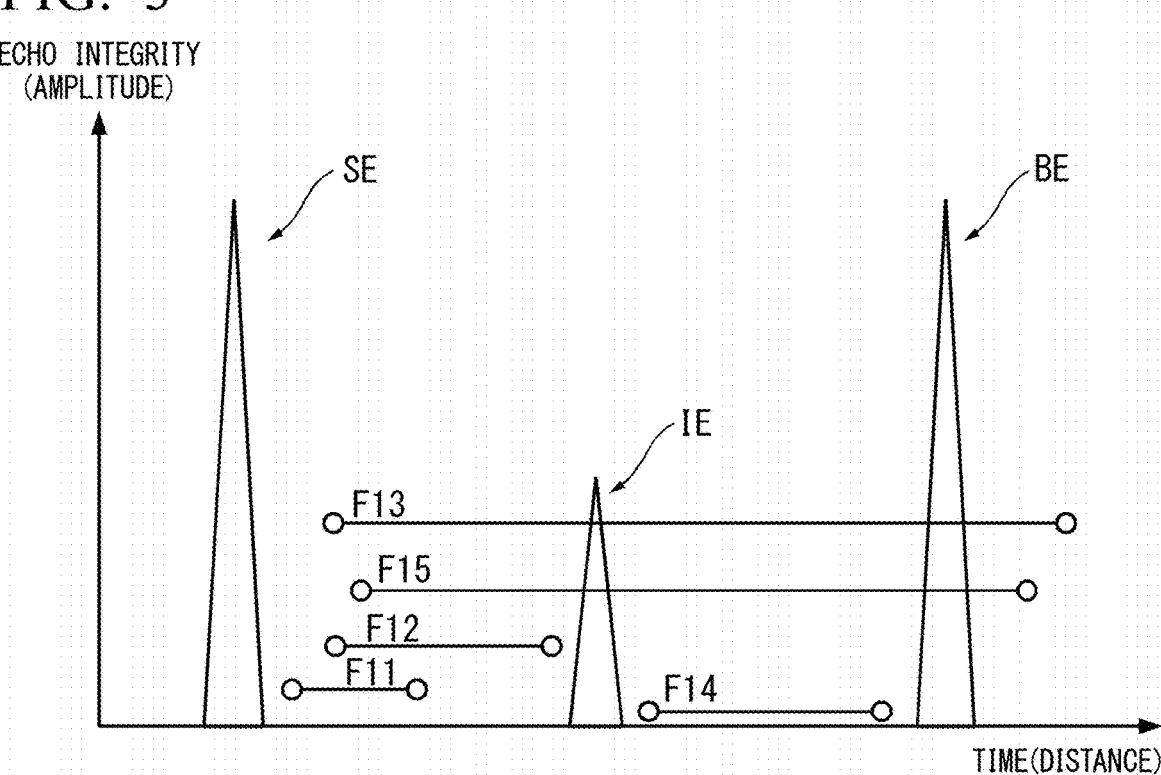
FIG. 3 is a diagram which shows an example of reflected wave measurement results according to the embodiment of the present disclosure.
Figure 4:
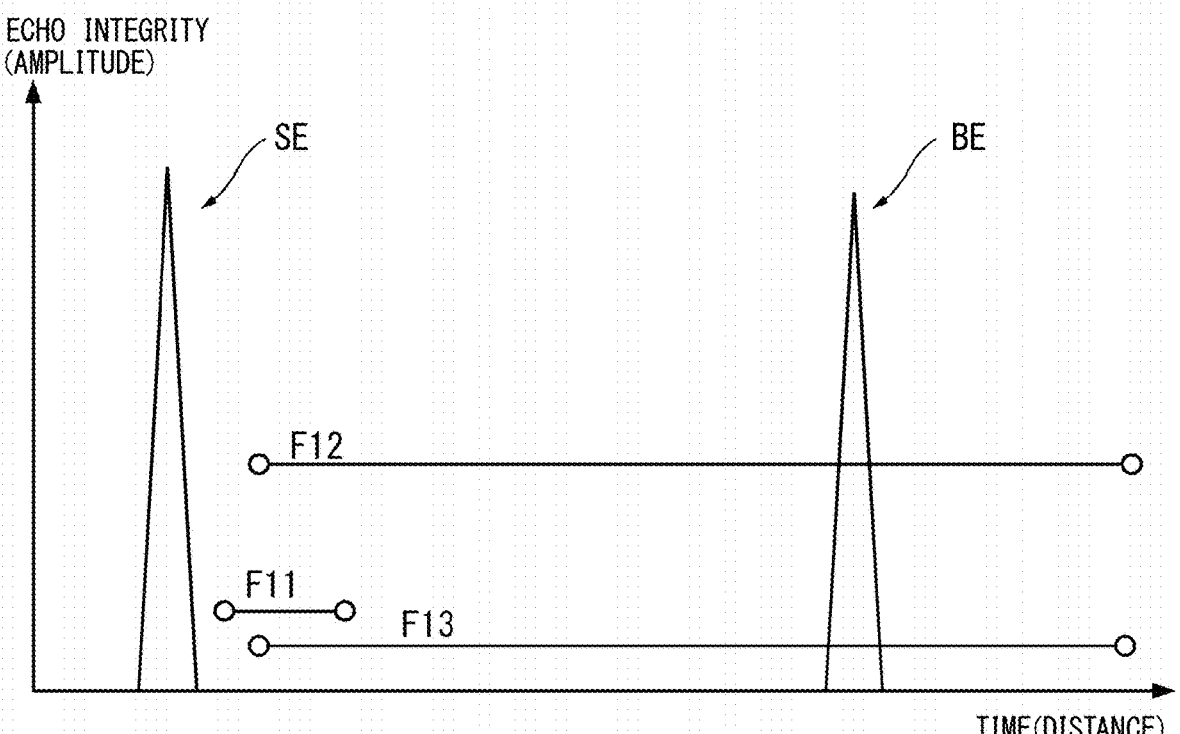
FIG. 4 is a diagram which shows an example of the reflected wave measurement results according to the embodiment of the present disclosure.
Figure 5:
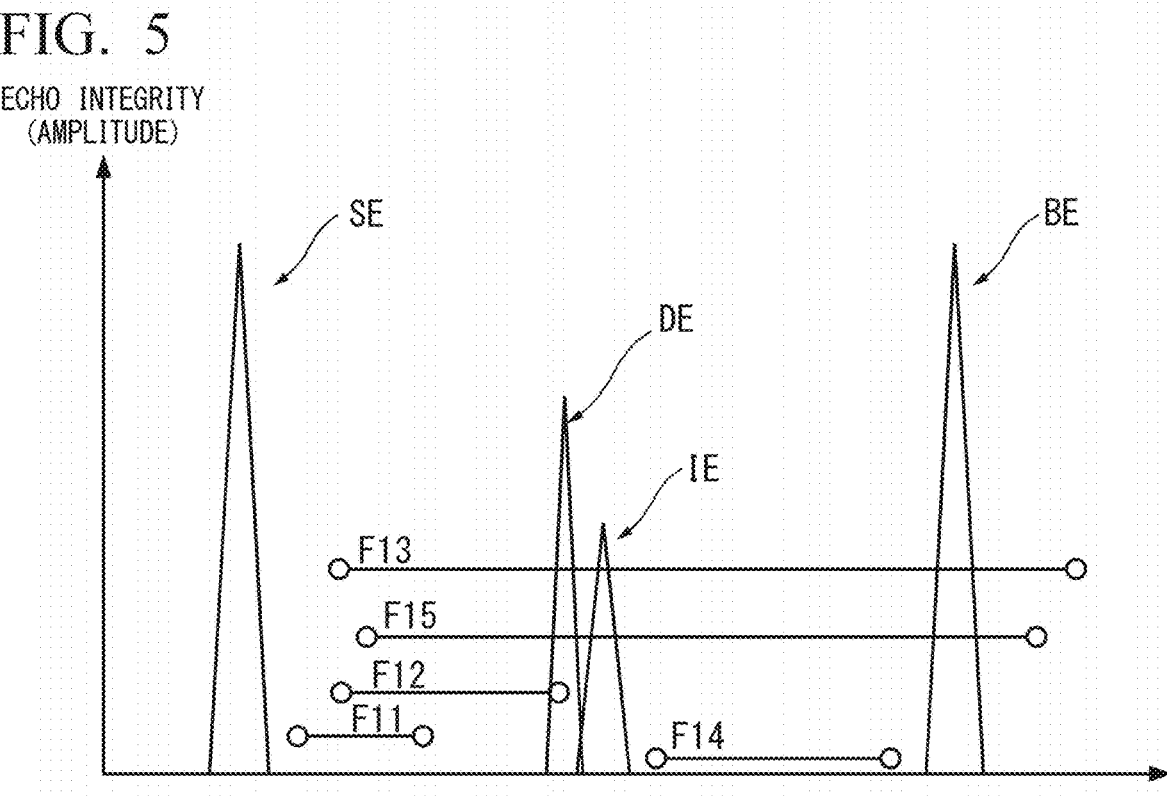
FIG. 5 is a diagram which shows an example of the reflected wave measurement results according to the embodiment of the present disclosure.
Figure 6:
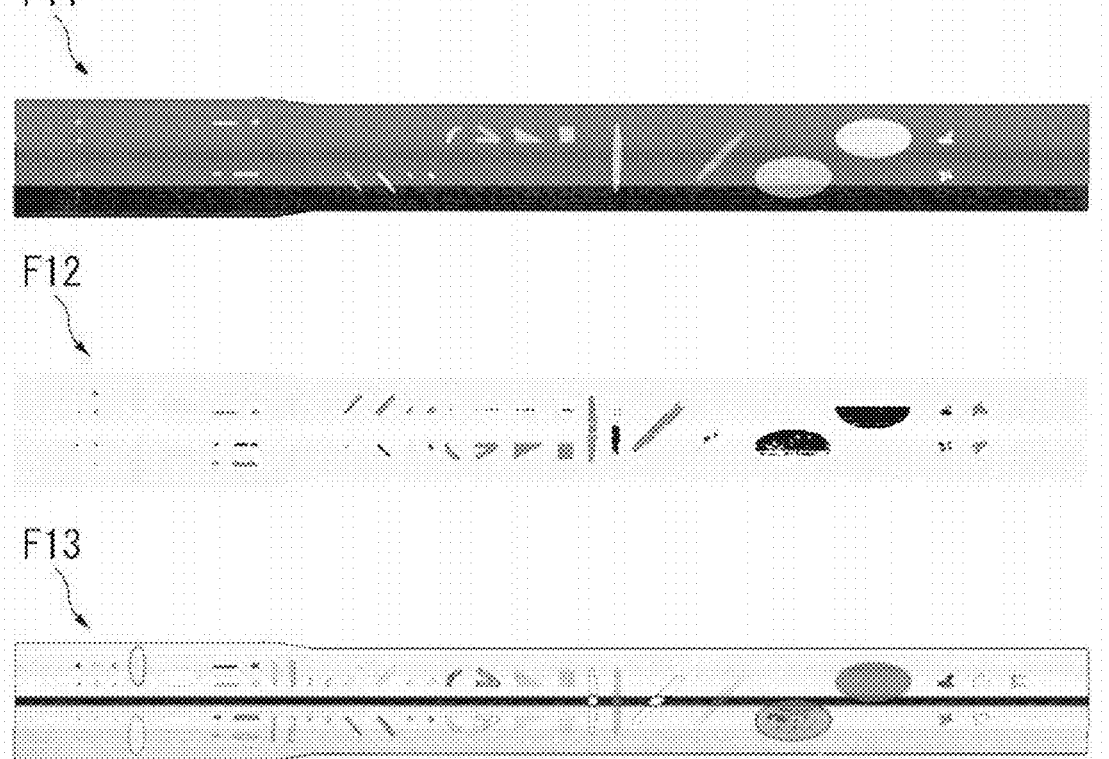
FIG. 6 is a diagram which shows an example of a plurality of standard ultrasonic images according to the embodiment of the present disclosure.
Figure 7:
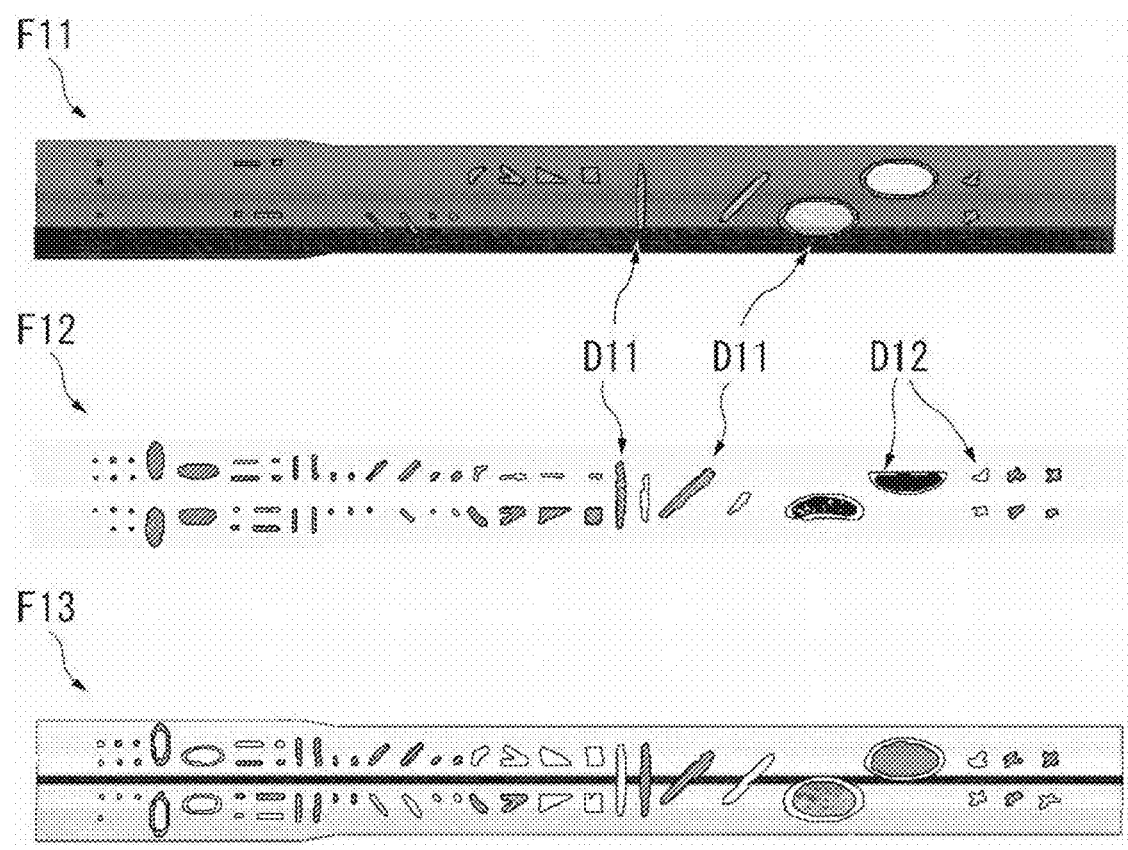
FIG. 7 is a diagram which shows an example of labeled defects of the plurality of standard ultrasonic images according to the embodiment of the present disclosure.
Figure 8:
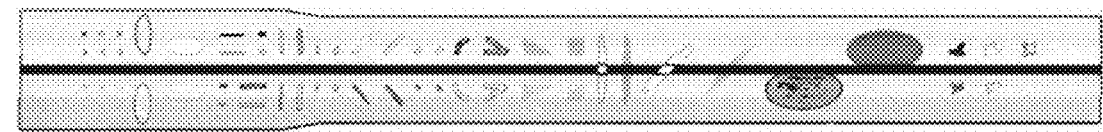
FIG. 8 is a diagram which shows an example of an ultrasonic image obtained by measuring an object according to the embodiment of the present disclosure.
Figure 9:
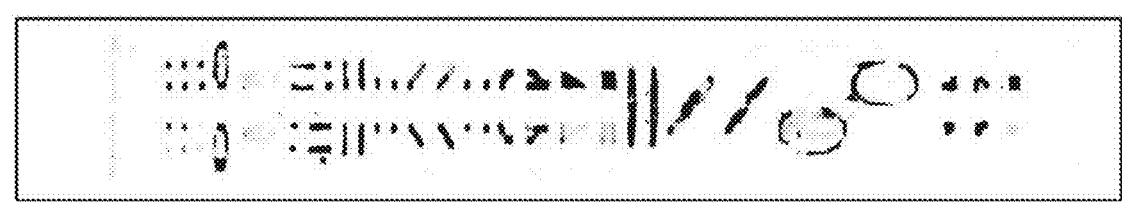
FIG. 9 is a diagram which shows an example of an enhanced image according to the embodiment of the present disclosure.
Figure 13:
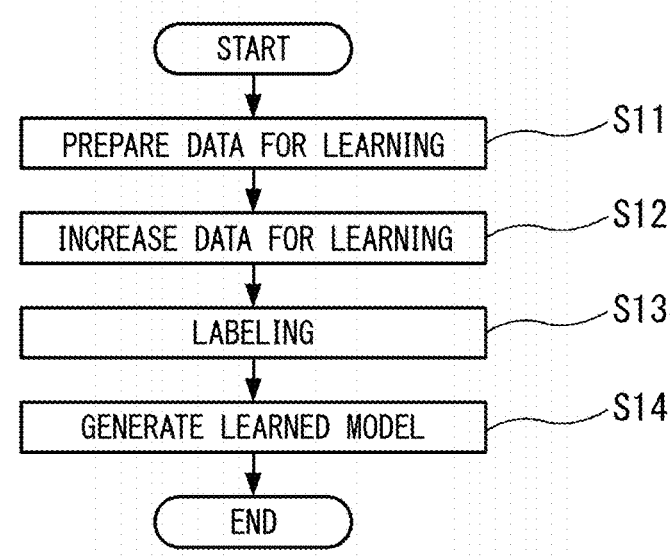
FIG. 13 is a flowchart which shows an operation example of a learning process in the defect analysis device according to the embodiment of the present disclosure.
Figure 14:
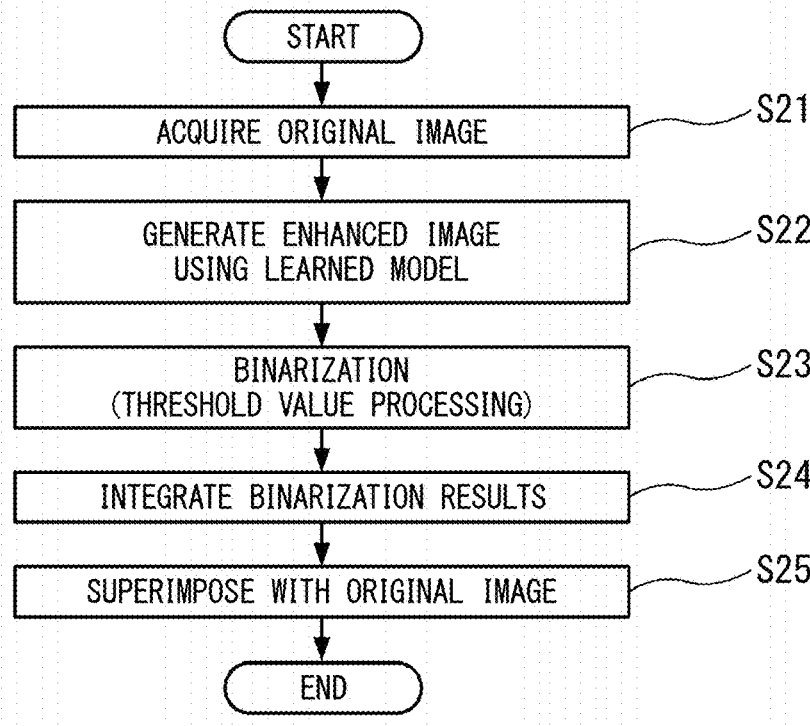
FIG. 14 is a flowchart which shows an operation example of a determination process in the defect analysis device according to the embodiment of the present disclosure.

Hereinafter, a defect analysis device, a defect analysis method, a non-transitory computer-readable recording medium, and a learning device according to embodiments of the present disclosure will be described with reference to FIGS. 1 to 15. FIG. 1 is a block diagram which shows a configuration example of a defect analysis device according to an embodiment of the present disclosure. FIG. 2 is a diagram which shows an example of an ultrasonic image obtained by measuring a standard test piece according to an embodiment of the present disclosure. FIGS. 3 to 5 are diagrams which show examples of reflected wave measurement results according to the embodiment of the present disclosure. FIG. 6 is a diagram which shows an example of a plurality of standard ultrasonic images according to the embodiment of the present disclosure. FIG. 7 is a diagram which shows an example of labeled defects of the plurality of standard ultrasonic images according to the embodiment of the present disclosure. FIG. 8 is a diagram which shows an example of an ultrasonic image obtained by measuring an object according to the embodiment of the present disclosure. FIG. 9 is a diagram which shows an example of an enhanced image according to the embodiment of the present disclosure. FIG. 10 is a diagram which shows an example of a plurality of binarized images according to the embodiment of the present disclosure. FIG. 11 is a diagram which shows an example of a plurality of binarized integrated images according to the embodiment of the present disclosure. FIG. 12 is a diagram which shows an example of a plurality of superimposed images according to the embodiment of the present disclosure. FIG. 13 is a flowchart which shows an operation example of a learning process in the defect analysis device according to the embodiment of the present disclosure. FIG. 14 is a flowchart which shows an operation example of a determination process in the defect analysis device according to the embodiment of the present disclosure. FIG. 15 is a schematic block diagram which shows a configuration of a computer according to at least one embodiment. In each figure, the same reference numerals will be used for the same or corresponding constituents, and the description thereof will be omitted as appropriate.

(Configuration of Defect Analysis Device)

A defect analysis device 1 shown in FIG. 1 can be configured using, for example, a computer such as a server, a personal computer, a tablet terminal, or the like, and includes the following units as functional constituents configured from a combination of hardware such as the computer and peripheral devices, and software such as programs to be executed by the computer. That is, the defect analysis device 1 includes a standard image acquisition unit 11, a teacher information input unit 12, a machine learning unit 13, a model storage unit 14, a target image acquisition unit 15, an enhanced image creation unit 16, and an output unit 17. In addition, the model storage unit 14 stores the learned model 141. Some or all of the functional constituents in the defect analysis device 1 may also be configured on a cloud. The defect analysis device 1 is also one constituent example of the learning device according to the present disclosure.

The defect analysis device 1 creates a plurality of enhanced images emphasizing defects embedded in the inspection target 4 based on a plurality of target ultrasonic images acquired from the inspection target 4 by the ultrasonic waveform acquisition device 2 using the learned model 141 in which a plurality of standard ultrasonic images acquired from the standard test piece 3 by the ultrasonic waveform acquisition device 2 are associated with teacher information representing positions, shapes, and sizes of a plurality of defects embedded in the standard test piece 3.

The ultrasonic waveform acquisition device 2 is, for example, a device for performing ultrasonic flaw inspection called an ultrasonic flaw detection device. In this case, the ultrasonic waveform acquisition device 2 acquires reflected waves of ultrasonic waves in a two-dimensional manner using a probe that is kept at a constant distance from the standard test piece 3 or inspection target 4 via water and can be scanned in a plane. An image in which a position of the probe is set to a two-dimensional pixel position and a height (intensity and amplitude) of the reflected waves is set to a value of each pixel is called a C-Scan image. The C-Scan image is a two-dimensionally mapped flaw detection result display image. In this embodiment, the C-Scan image is also called an ultrasonic image.

The ultrasonic waveform acquisition device 2 measures, for example, an echo waveform as shown in FIG. 3 at each position of the probe, and outputs measurement results for all positions to the defect analysis device 1. The measurement results include time-series data of a measurement value of a height of the echo waveform at each position. The measurement results include, for example, three peaks shown in FIG. 3 and data in which the height of the waveform other than those peaks is substantially zero. The measurement results of the ultrasonic waveform acquisition device 2 are also called waveform data. FIG. 3 represents changes in echo waves, with the horizontal axis representing time (or distance) and the vertical axis representing echo intensity (for example, amplitude). A leftmost peak is a surface echo SE, a central peak is an intermediate echo IE, and a rightmost peak is a bottom echo BE. The surface echo SE is waves reflected by a surface of the standard test piece 3 or the inspection target 4. The intermediate echo IE is waves reflected by an intermediate structure of the standard test piece 3 or the inspection target 4. In this case, the intermediate echo IE is not waves reflected by a defect. The bottom echo BE is waves reflected by a bottom of the standard test piece 3 or the inspection target 4. Moreover, FIG. 4 shows an example in which no intermediate echo IE is generated, and FIG. 5 shows an example in which an echo due to a defect (a defect echo DE) is measured.

FIG. 2 shows an example of the C-Scan image of the standard test piece 3. The standard test piece 3 is formed by stacking a plurality of layers of sheet-shaped members in which a plurality of pseudo defects (artificial defects) with different positions, shapes, sizes (depths, lengths, widths, and the like), types, and overlapping methods are arranged side by side. However, the standard test piece 3 is not limited to that being produced as a standard test piece, and may be, for example, a part that has undergone a natural defect simulation test or the like, or a part used in an actual machine. If only small-sized pseudo-defects are inserted into the standard test piece, it may lead to over-learning of small-sized defects, and the defect analysis device may not be able to detect large-sized defects, and therefore it is better to insert relatively large-sized pseudo defects. The C-scan image of the standard test piece 3 shown in FIG. 2 is, for example, an image in which a maximum echo intensity measured within a gate having a predetermined time width is set to the brightness value at each position in FIG. 3. The echo intensity becomes greater as the color is lighter (closer to white). Incidentally, the inspection target 4 is, for example, an aircraft composite material part.

The standard image acquisition unit 11 acquires a plurality of standard ultrasonic images acquired from the standard test piece 3. In addition, the target image acquisition unit 15 acquires a plurality of target ultrasonic images from the inspection target 4. The standard image acquisition unit 11 and the target image acquisition unit 15 acquire, for example, an ultrasonic image (waveform data) from the ultrasonic waveform acquisition device 2 via a communication line or the like or using a predetermined storage medium. In this embodiment, the standard image acquisition unit 11 and the target image acquisition unit 15 set a plurality of gates F11 to F15 or gates F11 to F13, as shown in FIGS. 3 to 5, and acquires an ultrasonic image for each set gate. A standard ultrasonic image is an ultrasonic image of the standard test piece 3. The target ultrasonic image is an ultrasonic image of the inspection target 4. The gates F11 to F15 are defined in terms of width (called a gate range) and height (called a gate level). For example, in the gate F11, only echoes located within the time width (or distance) indicated by each end (o mark) and having a level higher than the line connecting each end are to be measured. For example, in the example shown in FIG. 5, the defect echo DE can be detected in an ultrasonic image of the gate F12, an ultrasonic image of the gate F13, and an ultrasonic image of the gate F15. On the other hand, the defect echo DE cannot be detected in an ultrasonic image of the gate F11 or an ultrasonic image of the gate F14. In this case, the gate ranges and gate levels of the plurality of gates F11 to F15 are different from each other. The number of gates, gate range and gate level are specified for each part, for example.

FIG. 6 shows, for example, an example of each standard ultrasonic image of the gates F11 to F13 shown in FIG. 4. The standard image acquisition unit 11 acquires three standard ultrasonic images shown in FIG. 6 from a result of one measurement for the standard test piece 3.

As shown in FIG. 7, the teacher information input unit 12 performs labeling (annotating) on, for example, all defects that a nondestructive testing (NDT) engineer can detect from a corresponding image, with teacher information representing the positions, shapes and sizes of a plurality of defects for each standard ultrasonic image of the gates F11 to F13. Furthermore, respective defects are classified into a defect to be detected in a corresponding ultrasonic image and a defect to be detected in another ultrasonic image, and an order of priority is set. In the example shown in FIG. 7, among the plurality of set defects, defects with a high priority are indicated by a shaded area D11, and defects with a low priority are indicated by an unshaded area D12. For example, the learned model can be learned appropriately by giving a higher priority to a standard ultrasonic image having a gate in which feature values of defects appear clearly. In FIG. 7, each defect is displayed in a simplified area, but the teacher information can include data representing the shape of a defect using, for example, a plurality of pieces of positional information (coordinate information) and vector information. In addition, information on a priority can also be included in the teacher information in association with positional information and the like.

The machine learning unit 13 uses each standard ultrasonic image of the gates F11 to F13 labeled by the teacher information input unit 12 as teacher data, and performs machine learning (or re-machine learning) of an unlearned machine learning model (a model before machine learning of the learned model 141) or the learned model 141 whose input is each ultrasonic image, and whose output is an image representing a possibility of having defects by a pixel brightness value (the possibility of having defects is increased as the brightness value becomes large) (referred to as an enhanced image). The machine learning unit 13 stores the learned model 141 subjected to machine learning in the model storage unit 14.

The enhanced image creation unit 16 creates a plurality of enhanced images emphasizing a plurality of defects based on the learned model 141 and a plurality of target ultrasonic images acquired by the target image acquisition unit 15 in the manner as described above. FIG. 8 shows an example of a target ultrasonic image. FIG. 9 is an example of an enhanced image in which the plurality of enhanced images are superimposed. Note that an ultrasonic image before binarization, which will be described below, shown in FIG. 8 is also called an original image.

Also, the enhanced image creation unit 16 acquires a plurality of binarized images obtained by binarizing the plurality of enhanced images, integrates the plurality of binarized images, and creates a binarized integrated image representing a plurality of defects. FIG. 10 shows examples of the plurality of binarized images corresponding to the gates F11 to F13. FIG. 11 shows an example of a binarized integrated image representing the plurality of defects, created by integrating the plurality of binarized images. The enhanced image creation unit 16 sets, for example, different thresholds for each of the gates F11 to F13, and binarizes each enhanced image. In this case, the enhanced image creation unit 16 may set a threshold value or adjust a predetermined set value so that a black or white area is within a predetermined range. As a result, for example, it is possible to appropriately suppress a possibility of being erroneously determined as a defect.

In addition, the enhanced image creation unit 16 creates a superimposed image obtained by superimposing original images of a plurality of target ultrasonic images and the binarized integrated image. FIG. 12 shows an example of the superimposed image. Although FIG. 12 shows the superimposed image in grayscale, for example, the binarized integrated image may be an image with a color other than black instead of a black-and-white image, and then superimposed on the original images.

The output unit 17 outputs the superimposed image from a predetermined output device such as a display.

(Operation Example of Learning Process)

Next, an operation example of the defect analysis device 1 in a process of creating the learned model 141 will be described with reference to FIG. 13. In the process shown in FIG. 13, first, the standard image acquisition unit 11 acquires a result of the measurement of the standard test piece 3 from the ultrasonic waveform acquisition device 2 (step S11). Next, the standard image acquisition unit 11 generates (acquires) a plurality of standard ultrasonic images based on a plurality of gates (step S12). Next, the teacher information input unit 12 labels each standard ultrasonic image with defect information (step S13). Next, the machine learning unit 13 creates the learned model 141 by supervised machine learning and stores it in the model storage unit 14 (step S14).

(Operation Example of Determination Process)

Next, an operation example of the defect analysis device 1 in the defect determination process will be described with reference to FIG. 14. In the process shown in FIG. 14, first, the target image acquisition unit 15 acquires a measurement result of the inspection target 4 from the ultrasonic waveform acquisition device 2 (step S21). Next, the enhanced image creation unit 16 creates a plurality of target ultrasonic images corresponding to each gate, and creates a plurality of enhanced images using the learned model 141 (step S22). Next, the enhanced image creation unit 16 binarizes the plurality of enhanced images to create a plurality of binarized images (step S23). Next, the enhanced image creation unit 16 acquires the plurality of binarized images obtained by binarizing the plurality of enhanced images, integrates the plurality of binarized images, and creates a binarized integrated image representing the plurality of defects (step S24). Next, the enhanced image creation unit 16 creates a superimposed image obtained by superimposing original images of the plurality of target ultrasonic images and the binarized integrated image, and the output unit 17 outputs it (step S25).

(Effect)

The defect analysis device, the defect analysis method, and the program with the configuration described above create a plurality of enhanced images emphasizing a plurality of defects based on a learned model based on a plurality of standard ultrasonic images obtained from a standard test piece, and a plurality of target ultrasonic images acquired from an inspection target. In addition, the learned model is learned by giving a priority to the defects to be detected among a plurality of defects in each standard ultrasonic image. Therefore, according to the defect analysis device, the defect analysis method, and the program of the embodiment, defect analysis using an enhanced image in which defects to be detected are preferentially emphasized becomes possible. For this reason, it is possible to efficiently analyze defects.

In the embodiment described above, since a plurality of target ultrasonic images are created using a plurality of gates with different gate ranges and gate levels, it is possible to increase a probability that a defect echo can be detected with an appropriate S/N ratio (a signal-noise ratio). In addition, in the embodiment described above, since waveform data using a plurality of gates with different gate ranges and gate levels are aggregated into two-dimensional data, for example, processing time can be shortened compared to a case in which all waveform data is used as input information of a machine learning model.

In addition, in the embodiment described above, it is possible to create a binarized integrated image that is binarized in accordance with each enhanced image. For this reason, it is possible to suppress erroneous determination of defects.

Moreover, in the embodiment described above, since the original images of the target ultrasonic images and the binarized integrated image are superimposed, it is easy to compare the original images of the target ultrasonic images and the binarized integrated image.

Moreover, in the embodiment described above, since the inspection target 4 is a composite material, it is easy to detect defects in the composite material.

In addition, when the learned model 141 based on a plurality of standard ultrasonic images acquired from the standard test piece is created, the learning device 1 with the configuration described above is learned by giving a priority to a defect to be detected among a plurality of defects in each standard ultrasonic image. Therefore, according to the learning device 1, it is possible to perform defect analysis using a learned model in which defects to be detected are learned preferentially. For this reason, it is possible to efficiently analyze defects.

Other Embodiments

As described above, the embodiment of the present disclosure has been described in detail with reference to the drawings, but a specific configuration is not limited to this embodiment, and design changes and the like can also be made within a range not departing from the gist of the present disclosure.

<Computer Configuration>

FIG. 15 shows a configuration of a computer according to at least one embodiment.

A computer 90 includes a processor 91, a main memory 92, a storage 93, and an interface 94.

The defect analysis device 1 described above is mounted on the computer 90. An operation of each processing unit described above is stored in the storage 93 in the form of a program. The processor 91 reads the program from the storage 93, develops it in the main memory 92, and executes the processing described above according to the program. In addition, the processor 91 secures storage areas corresponding to the storage units described above in the main memory 92 according to the program.

The program may be for realizing some of functions that the computer 90 is caused to exhibit. For example, the program may cause the functions to be exhibited in combination with another program already stored in the storage, or in combination with another program installed in another device. In another embodiment, the computer may include a custom large scale integrated circuit (LSI) such as a programmable logic device (PLD) in addition to or instead of the constituents described above. Examples of the PLD include a programmable array logic (PAL), a generic array logic (GAL), a complex programmable logic device (CPLD), a field programmable gate array (FPGA), and the like. In this case, some or all of the functions implemented by a processor may be realized by a corresponding integrated circuit.

Examples of the storage 93 include a hard disk drive (HDD), a solid state drive (SSD), a magnetic disk, a magneto-optical disc, a compact disc read only memory (CD-ROM), a digital versatile disc read only memory (DVD-ROM), a semiconductor memory, and the like. The storage 93 may be an internal medium directly connected to a bus of the computer 90, or an external medium connected to the computer 90 via the interface 94 or a communication line. In addition, when this program is distributed to the computer 90 via a communication line, the computer 90 that receives the distribution may develop the program in the main memory 92 and execute the processing described above. In at least one embodiment, the storage 93 is a non-transitory tangible storage medium.

<Supplementary Note>

The defect analysis device 1 described in the embodiment described above is, for example, understood as follows.

(1) The defect analysis device 1 according to a first aspect includes the model storage unit 14 configured to store the learned model 141 in which teacher information representing positions, shapes, and sizes of a plurality of defects embedded in the standard test piece 3 is associated with detection information of the plurality of defects detected based on a plurality of standard ultrasonic images acquired from the standard test piece 3, the target image acquisition unit 15 configured to acquire a plurality of target ultrasonic images from the inspection target 4, and the enhanced image creation unit 16 configured to create a plurality of enhanced images emphasizing the plurality of defects based on the learned model 141 and the plurality of target ultrasonic images, in which the learned model is learned by giving a priority to defects to be detected among the plurality of defects in each standard ultrasonic image. According to this aspect, defect analysis using an enhanced image in which defects to be detected are preferentially emphasized becomes available. For this reason, it is possible to efficiently analyze a defect.

(2) The defect analysis device 1 according to the second aspect is the defect analysis device 1 of (1), and the plurality of standard ultrasonic images are a plurality of C-Scan images.

(3) The defect analysis device 1 according to a third aspect is the defect analysis device 1 of (1) or (2), in which gate ranges and gate levels of the plurality of C-Scan images are different from each other. According to this aspect, since a plurality of target ultrasonic images are created using a plurality of gates having different gate ranges and gate levels, the probability that defect echoes can be detected with an appropriate S/N ratio (signal-to-noise ratio) can be increased. Moreover, according to this aspect, waveform data using a plurality of gates with different gate ranges and gate levels are aggregated into two-dimensional data, so that the processing time can be shortened.

(4) The defect analysis device 1 according to a fourth aspect is the defect analysis device 1 according to any one of (1) to (3), in which the plurality of target ultrasonic images are a plurality of C-Scan images with different gate ranges and gate levels, and the enhanced image creation unit 16 acquires a plurality of binarized images obtained by binarizing the plurality of enhanced images, integrates the plurality of binarized images, and creates a binarized integrated image representing the plurality of defects. According to this aspect, a binarized integrated image can be created from the plurality of binarized images binarized in accordance with each enhanced image. For this reason, it is possible to suppress erroneous determination of defects.

(5) The defect analysis device 1 according to a fifth aspect is the defect analysis device 1 according to any one of (1) to (4), in which the enhanced image creation unit 16 creates a superimposed image obtained by superimposing original images of the plurality of target ultrasonic images and the binarized integrated image. According to this aspect, it is easy to compare the original images of the target ultrasonic images and the binarized integrated image.

(6) A defect analysis device 1 according to a sixth aspect is the defect analysis device 1 according to any one of (1) to (5), and the inspection target 4 is a composite material. According to this aspect, it is easy to detect defects in the composite material.

(7) The defect analysis method according to a seventh aspect includes a step of acquiring a plurality of target ultrasonic images from the inspection target 4, and a step of creating a plurality of enhanced images emphasizing a plurality of defects based on the learned model 141 in which teacher information representing positions, shapes, and sizes of the plurality of defects embedded in the standard test piece 3 is associated with detection information of the plurality of defects detected based on a plurality of standard ultrasonic images acquired from the standard test piece 3, and the plurality of target ultrasonic images, in which the learned model is learned by giving a priority to defects to be detected among the plurality of defects in each standard ultrasonic image. According to this aspect, defect analysis using an enhanced image in which defects to be detected are preferentially emphasized becomes available. For this reason, it is possible to efficiently analyze a defect.

(8) The non-transitory computer-readable recording medium according to an eighth aspect stores a program causing a computer to execute, a step of acquiring a plurality of target ultrasonic images from the inspection target 4, and a step of creating a plurality of enhanced images emphasizing a plurality of defects based on the learned model 141 in which teacher information representing positions, shapes, and sizes of the plurality of defects embedded in the standard test piece 3 is associated with detection information of the plurality of defects detected based on a plurality of standard ultrasonic images acquired from the standard test piece 3, and the plurality of target ultrasonic images, in which the learned model is learned by giving a priority to defects to be detected among the plurality of defects in each standard ultrasonic image. According to this aspect, defect analysis using an enhanced image in which defects to be detected are preferentially emphasized becomes available. For this reason, it is possible to efficiently analyze a defect.

(9) The learning device 1 according to a ninth aspect includes a machine learning unit 13 configured to generate the learned model 141 by performing learning on the basis of teacher information representing positions, shapes, and sizes of a plurality of defects embedded in the standard test piece 3 and detection information of the plurality of defects detected based on a plurality of standard ultrasonic images acquired from the standard test piece 3, in which the learned model 141 is learned by giving a priority to defects to be detected among the plurality of defects in each standard ultrasonic image. According to this aspect, defect analysis using a learned model in which defects to be detected are preferentially emphasized becomes available. For this reason, it is possible to efficiently analyze a defect.

According to the defect analysis device, the defect analysis method, the non-transitory computer-readable recording medium and the learning device of the present disclosure, it is possible to efficiently analyze defects.

EXPLANATION OF REFERENCES

1 Defect analysis device (learning device)
2 Ultrasonic waveform acquisition device
3 Standard test piece
4 Inspection target
11 Standard image acquisition unit
12 Teacher information input unit 13 Machine learning unit
14 Model storage unit
15 Target image acquisition unit
16 Enhanced image creation unit
141 Learned model

What is claimed is:

1. A defect analysis device comprising:
a computer configured to:
   store a learned model in which teacher information representing positions, shapes, and actual sizes of a plurality of defects embedded in a standard test piece is associated with detection information of the plurality of defects detected based on a plurality of standard ultrasonic images acquired from the standard test piece;
   acquire a plurality of target ultrasonic images from an inspection target;
   create a plurality of enhanced images emphasizing the plurality of defects based on the learned model and the plurality of target ultrasonic images; and
   output the created enhanced images to an output device,
wherein the plurality of standard ultrasonic images is a plurality of C-Scan images, and
wherein the learned model is learned by giving a higher priority to standard ultrasonic images of the plurality of standard ultrasonic images having a gate in which feature values of defects having a higher clarity.

2. The defect analysis device according to claim 1, wherein gate ranges and gate levels of the plurality of C-Scan images are different from each other.

3. The defect analysis device according to claim 2, wherein the plurality of target ultrasonic images are a plurality of C-Scan images with different gate ranges and gate levels, and
wherein the computer is further configured to
   acquire a plurality of binarized images obtained by binarizing the plurality of enhanced images,
   integrate the plurality of binarized images, and
   create a binarized integrated image representing the plurality of defects.

4. The defect analysis device according to claim 3, wherein the computer is further configured to create a superimposed image obtained by superimposing original images of the plurality of target ultrasonic images and the binarized integrated image.

5. The defect analysis device according to claim 4, wherein the inspection target is a composite material.

6. A defect analysis method comprising:
a step of acquiring, by a computer, a plurality of target ultrasonic images from an inspection target;
a step of creating, by the computer, a plurality of enhanced images emphasizing a plurality of defects based on a learned model in which teacher information representing positions, shapes, and actual sizes of the plurality of defects embedded in a standard test piece is associated with detection information of the plurality of defects detected based on a plurality of standard ultrasonic images acquired from the standard test piece, and the plurality of target ultrasonic images; and a step of outputting, by the computer, the created enhanced images to an output device,
wherein the plurality of standard ultrasonic images is a plurality of C-Scan images, and
wherein the learned model is learned by giving a higher priority to standard ultrasonic images of the plurality of standard ultrasonic images having a gate in which feature values of defects having a higher clarity.

7. A non-transitory computer-readable recording medium that stores a program causing a computer to execute
a step of acquiring a plurality of target ultrasonic images from an inspection target,
a step of creating a plurality of enhanced images emphasizing a plurality of defects based on a learned model in which teacher information representing positions, shapes, and actual sizes of the plurality of defects embedded in a standard test piece is associated with detection information of the plurality of defects detected based on a plurality of standard ultrasonic images acquired from the standard test piece, and the plurality of target ultrasonic images; and
a step of outputting the created enhanced images to an output device,
wherein the plurality of standard images is a plurality of C-Scan images, and
wherein the learned model is learned by giving a higher priority to standard ultrasonic images of the plurality of standard ultrasonic images having a gate in which feature values of defects having a higher clarity.

8. The defect analysis device according to claim 1, wherein the teacher information includes data representing the shape of a defect using a plurality of pieces of coordinate information and vector information.

9. The defect analysis device according to claim 1, wherein information on the priority is included in the teacher information in association with positional information.

10. The defect analysis device according to claim 1, wherein the computer is further configured to train the learned model using the teacher information.

11. The defect analysis device according to claim 1, wherein the actual sizes of the plurality of defects includes at least one of a corresponding depth, length, or width of each of the plurality of defects.

12. The defect analysis device according to claim 1, wherein
   wherein gate ranges and gate levels of the plurality of C-Scan images are set to be different from each other,
   wherein the plurality of standard ultrasonic images is acquired for each set gate, and
   wherein a number of gates, a gate range of each gate, and a gate level of each gate are specified for each part as an analysis target including the standard test piece.

13. The defect analysis device according to claim 1, wherein
   the learned model learns by prioritizing defects that are emphasized based on brightness values among the plurality of defects in each standard ultrasonic image as defects to be detected.

* * * * *